(12) United States Patent
Kanahara et al.

(10) Patent No.: US 12,506,352 B2
(45) Date of Patent: Dec. 23, 2025

(54) POWER SUPPLY CONTROL APPARATUS AND POWER SUPPLY CONTROL METHOD

(71) Applicant: HONDA MOTOR CO., LTD., Tokyo (JP)

(72) Inventors: Hirokazu Kanahara, Tokyo (JP); Yuki Sugiyama, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/451,909

(22) Filed: Aug. 18, 2023

(65) Prior Publication Data
US 2024/0106258 A1    Mar. 28, 2024

(30) Foreign Application Priority Data
Sep. 22, 2022   (JP) .................................. 2022-151141

(51) Int. Cl.
*H02J 7/14* (2006.01)
*F02N 11/08* (2006.01)

(52) U.S. Cl.
CPC ........ *H02J 7/1446* (2013.01); *F02N 11/0833* (2013.01); *F02N 11/0862* (2013.01);
(Continued)

(58) Field of Classification Search
CPC ............. F02N 11/0814; F02N 11/0803; F02N 11/0833; H02J 7/007; H02J 7/1446
See application file for complete search history.

(56) References Cited

U.S. PATENT DOCUMENTS 8,541,984 B2 * 9/2013 Hsu ................... H02J 7/007192
320/138
2010/0072958 A1 * 3/2010 Wada ..................... B60W 10/08
322/22
(Continued)

FOREIGN PATENT DOCUMENTS

JP          2007-76483 A       3/2007
JP          2010-265878 A      11/2010
(Continued)

OTHER PUBLICATIONS

Japanese Office Action dated Apr. 2, 2024 issued in corresponding Japanese application No. 2022-151141; English machine translation included (14 pages).
(Continued)

*Primary Examiner* — Phutthiwat Wongwian
*Assistant Examiner* — Sherman D Manley
(74) *Attorney, Agent, or Firm* — Rankin, Hill & Clark LLP

(57) ABSTRACT

A power supply control apparatus includes: a current supply switching section that switches between a current restricting state, in which a current to be supplied from a storage battery to electrical equipment is restricted to a predetermined upper limit current or less, and a current non-restricting state, in which a current exceeding the upper limit current is allowed to be supplied from the storage battery to the electrical equipment; and a current supply control section that executes current restriction processing to cause the current supply switching section to set up the current restricting state before an engine is started, the engine having been stopped by an idling stop function.

10 Claims, 4 Drawing Sheets

(52) U.S. Cl.
CPC ...... *F02N 11/087* (2013.01); *F02N 2200/061* (2013.01); *F02N 2200/063* (2013.01)

(56) References Cited

U.S. PATENT DOCUMENTS

| | | | | |
|---|---|---|---|---|
| 2012/0116657 | A1* | 5/2012 | Kawamoto | ......... F02N 11/0822 |
| | | | | 701/113 |
| 2013/0106180 | A1* | 5/2013 | Akimasa | ............... H02J 7/1423 |
| | | | | 307/9.1 |
| 2013/0289854 | A1* | 10/2013 | Takahashi | ............... B60L 53/00 |
| | | | | 701/112 |
| 2015/0203059 | A1* | 7/2015 | Narita | ............... H04W 52/0261 |
| | | | | 307/9.1 |
| 2018/0019598 | A1 | 1/2018 | Tsuchiya et al. | |
| 2018/0072300 | A1* | 3/2018 | Jang | ...................... B60W 20/10 |
| 2018/0134240 | A1* | 5/2018 | Tahara | ................. H02J 7/1446 |
| 2019/0204890 | A1* | 7/2019 | Kitanosako | ............... G06F 1/30 |
| 2019/0299968 | A1 | 10/2019 | Morita | |
| 2020/0247267 | A1 | 8/2020 | Kuwabara et al. | |
| 2020/0350725 | A1* | 11/2020 | Elghrawi | ............ H02J 7/1446 |
| 2022/0355751 | A1* | 11/2022 | Choi | ................... F02N 11/0818 |

FOREIGN PATENT DOCUMENTS

| | | |
|---|---|---|
| JP | 2014-34916 A | 2/2014 |
| JP | 2015-134591 A | 7/2015 |
| JP | 2015-172723 A | 10/2015 |
| JP | 2015-223896 A | 12/2015 |
| JP | 2017-77847 A | 4/2017 |
| JP | 2017-177824 A | 10/2017 |
| JP | 2018-11435 A | 1/2018 |
| JP | 2019-16966 A | 1/2019 |
| JP | 2019-173665 A | 10/2019 |
| JP | 2020-127308 A | 8/2020 |
| JP | 2022-104112 A | 7/2022 |

OTHER PUBLICATIONS

Japanese Office Action dated Jan. 16, 2024 issued in corresponding Japanese application No. 2022-151141 (6 pages).

* cited by examiner

POWER SUPPLY CONTROL APPARATUS AND POWER SUPPLY CONTROL METHOD

INCORPORATION BY REFERENCE

The present application claims priority under 35 U.S.C. § 119 to Japanese Patent Application No. 2022-151141 filed on Sep. 22, 2022. The content of the application is incorporated herein by reference in its entirety.

BACKGROUND OF THE INVENTION

Field of the Invention

The present invention relates to a power supply control apparatus and a power supply control method.

Description of the Related Art

Research and development have been recently conducted on charging and power supply in vehicles equipped with secondary batteries that contribute to energy efficiency to ensure access to affordable, reliable, sustainable and advanced energy for more people. For example, when a vehicle with an idling stop function returns from idling stop, the voltage of the electric power to be supplied to the electric equipment provided in the vehicle may drop significantly with the power supply to the starter motor, resulting in a disadvantage such as interruption of the operation of the electrical equipment. Therefore, for example, Japanese Patent Laid-Open No. 2017-177824 proposes configuration such that power supply from a secondary battery to electrical equipment is performed via a DC-DC converter so that the power to be supplied to the electrical equipment is prevented from voltage drop in operation of a starter motor.

Meanwhile, in the technique relating to charging and power supply in vehicles equipped with secondary batteries, when a DC-DC converter is provided to prevent the voltage drop of the power to be supplied to the electric load in returning from the idling stop, as in the above background art, there are disadvantageously a complicated circuit configuration of the apparatus and an increased cost of the apparatus. Therefore, it is a problem of the present disclosure to prevent a voltage drop of power to be supplied to electrical equipment in returning from idling stop, with a simple and cost-saving configuration.

In order to solve the above problem, an object of the present application is to provide a power supply control apparatus and a power supply control method capable of preventing a voltage drop of power to be supplied to electrical equipment in returning from idling stop with a simple and cost-saving configuration. The apparatus and the method will eventually contribute to efficiency improvement of energy.

SUMMARY OF THE INVENTION

A first aspect for achieving the above object is a power supply control apparatus that is mounted in a vehicle having an idling stop function for stopping an engine and starting the engine, and controls power supply to electrical equipment operated by power to be supplied from a storage battery provided in the vehicle, the power supply control apparatus including: a current supply switching section that switches between: a current restricting state in which a current to be supplied from the storage battery to the electrical equipment is restricted to a predetermined current or less; and a current non-restricting state in which a current exceeding the predetermined current is allowed to be supplied from the storage battery to the electrical equipment; and a current supply control section that executes current restriction processing to cause the current supply switching section to set up the current restricting state before the engine is started, the engine having been stopped by the idling stop function.

The power supply control apparatus may further include: a lower limit power supply information acquisition section that acquires lower limit power supply information indicating a lower limit of a power-supply voltage or a power-supply power that enables the electrical equipment or a connected device to perform a predetermined operation, the connected device being connected to the electrical equipment, the connected device being supplied with power from the storage battery via the electrical equipment; and a predetermined current setting section that sets the predetermined current based on the lower limit power supply information.

The power supply control apparatus may be configured such that the predetermined current setting section sets the predetermined current: so that an output voltage of the storage battery is higher than the lower limit of the power-supply voltage indicated by the lower limit power supply information; or so that power to be supplied from the storage battery to the electrical equipment is greater than the lower limit of the power-supply power indicated by the lower limit power supply information.

The power supply control apparatus may further include a storage battery state recognition section that recognizes a state of the storage battery, wherein the current supply control section does not execute the current restriction processing if it is determined, from a state of the storage battery, that the idling stop function cannot be performed, the state being recognized by the storage battery state recognition section.

The power supply control apparatus may be configured such that the current supply control section starts the current restriction processing within a predetermined time after the engine is stopped by the idling stop function.

The power supply control apparatus may further include a running state recognition section that recognizes a running state of the vehicle, wherein in which the current supply control section determines a timing to start the current restriction processing based on the running state of the vehicle recognized by the running state recognition section.

The power supply control apparatus may be configured such that the current supply control section starts the current restriction processing when the running state recognition section recognizes that the vehicle has started deceleration.

The power supply control apparatus may be configured such that the current supply control section does not start the current restriction processing when the running state recognition section recognizes that the vehicle has started deceleration while a preceding vehicle of the vehicle is moving forward.

A second aspect for achieving the above object is a power supply control method causing a computer to control power supply to electrical equipment in a vehicle having an idling stop function for stopping an engine and starting the engine, the electrical equipment being operated by power to be supplied from a storage battery provided in the vehicle, the power supply control method including: a current supply switching step that switches between: a current restricting state in which a current to be supplied from the storage battery to the electrical equipment is restricted to a predetermined current or less; and a current non-restricting state in which a current exceeding the predetermined current is allowed to be supplied from the storage battery to the electrical equipment; and a current supply control step that executes current restriction processing to cause the current supply switching step to set up the current restricting state before the engine is started, the engine having been stopped by the idling stop function.

Advantageous Effect of Invention

The above power supply control apparatus makes it possible to prevent the voltage drop of power to be supplied to the electrical equipment in returning from the idling stop, with a simple and cost-saving configuration.

DETAILED DESCRIPTION OF THE PREFERRED EMBODIMENTS

Figure 1:
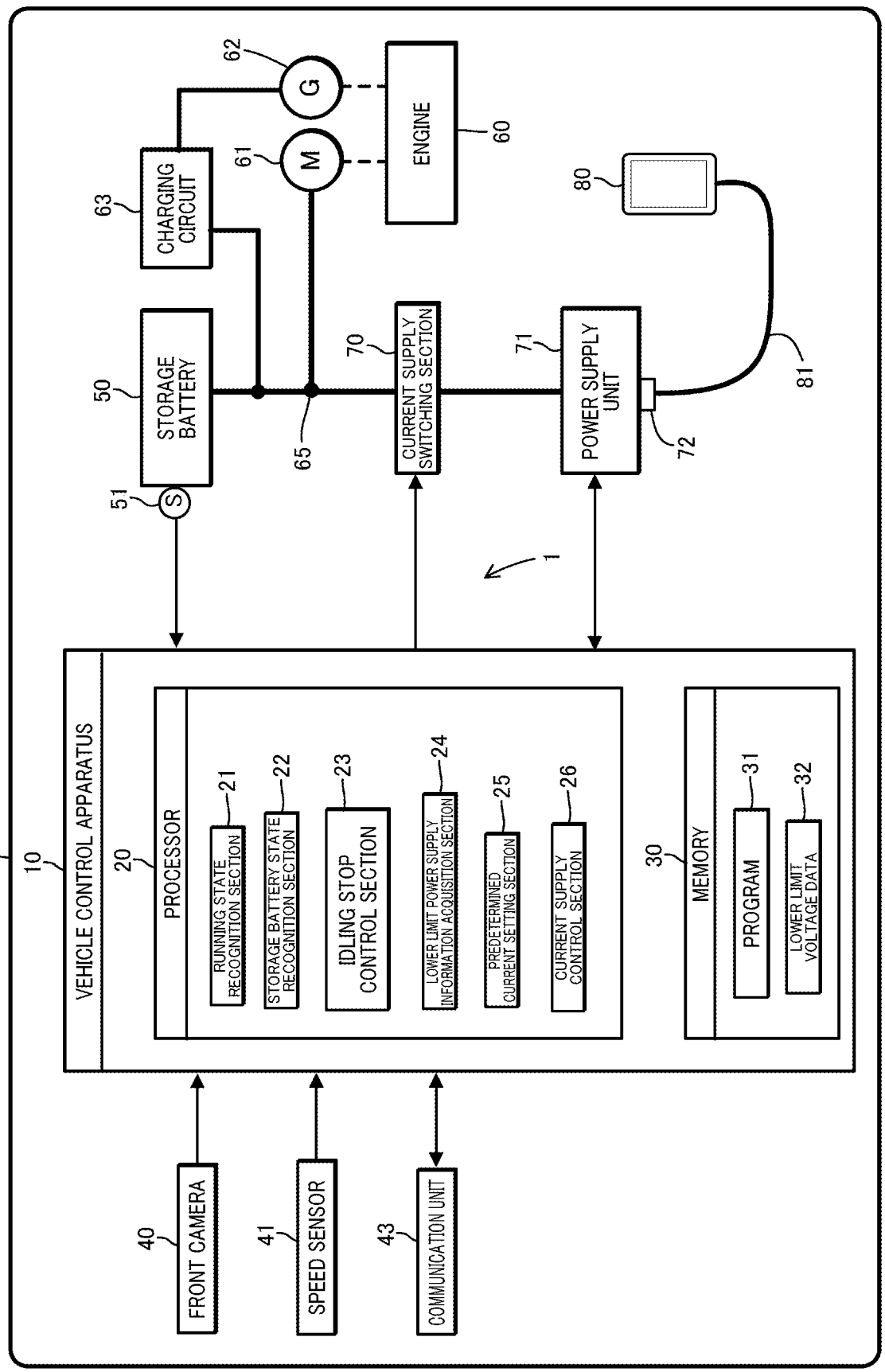
FIG. 1 is a configuration diagram of a power supply control apparatus and a vehicle equipped with the power supply control apparatus.

1. Configuration of Power Supply Control Apparatus

A configuration of a power supply control apparatus 1 of the present embodiment will be described with reference to FIG. 1. The power supply control apparatus 1 includes: a part of functions of a vehicle control apparatus 10 that is mounted in a vehicle 100 and controls operation of the vehicle 100; and a current supply switching section 70.

The vehicle 100 includes: a front camera 40 that captures an image of front of the vehicle 100; a speed sensor 41 that detects the running speed of the vehicle 100; and a communication unit 43 that communicates with a server outside the vehicle 100, a communication terminal 80 used in the passenger compartment of the vehicle 100, etc. The vehicle 100 further includes: a storage battery 50; an engine 60 that drives driving wheels (not shown); a starter motor 61 that starts the engine 60; a generator 62 driven by engine 60; and a charging circuit 63 that converts the power generated by the generator 62 into charging power for the storage battery 50 and outputs the power to the storage battery 50.

The storage battery 50 includes a storage battery sensor 51 that detects the state of the storage battery 50 (output voltage, output current, temperature, etc.). The starter motor 61 operates with electric power to be supplied from the storage battery 50. The storage battery 50 is connected to a power supply unit 71 via a current supply switching section 70. The power supply unit 71 supplies power to a connected device such as the communication terminal 80 connected to a connection terminal 72, to charge the connected device. The power supply unit 71 charges with power of 5 W to 15 W, or charges with power higher than that (about 15 W to 100 W).

The communication terminal 80 is a smartphone, mobile phone, tablet terminal, etc. The connected devices include, in addition to the communication terminal 80, devices that operate on a rechargeable battery such as portable game machines and tools. Also, the power supply unit 71 corresponds to electrical equipment of the present disclosure, and the electrical equipment includes a navigation apparatus, an audio apparatus in addition to the power supply unit 71.

The current supply switching section 70 is provided between the power supply unit 71 and the branch point 65 from the storage battery 50 to the starter motor 61 and the power supply unit 71. The current supply switching section 70 switches between a current restricting state and a current non-restricting state according to a control signal output from the vehicle control apparatus 10. In the current restricting state, the current to be supplied from the storage battery 50 to the power supply unit 71 is restricted to a predetermined current or less. In the current non-restricting state, a current exceeding a predetermined current is allowed to be supplied from the storage battery 50 to the power supply unit 71. Further, the current supply switching section 70 sets up a predetermined current according to a predetermined current instruction signal output from the vehicle control apparatus 10.

The vehicle control apparatus 10 is a control unit that includes a processor 20, a memory 30, etc. The processor 20 corresponds to a computer of the present disclosure. The memory 30 stores: a control program 31 for controlling the vehicle control apparatus 10; and lower limit voltage data 32 that indicates the lower limit (lower limit voltage) in the guaranteed operation voltage range of the device to be connected to the power supply unit 71.

The processor 20 reads and executes the program 31, to function as a running state recognition section 21, a storage battery state recognition section 22, an idling stop control section 23, a lower limit power supply information acquisition section 24, a predetermined current setting section 25, and a current supply control section 26.

The processing, in which the current supply control section 26 controls the state of the current supply switching section 70 to switch between the current restricting state and the current non-restricting state, corresponds to a current supply switching step in a power supply control method of the present disclosure. Processing, in which the current supply control section 26 causes the current supply switching section 70 to set up a current restricting state before starting the engine 60 stopped by an idling stop function, corresponds to a current supply control step in a power supply control method of the present disclosure.

The running state recognition section 21 recognizes: the running state of the preceding vehicle of the vehicle 100 based on the image of the front of the vehicle 100 captured by the front camera 40;
acceleration/deceleration of the vehicle 100 based on the speed of the vehicle 100 detected by the speed sensor 41, etc. Note that the running state of the preceding vehicle may be recognized by an object sensor such as a radar instead of the front camera 40, or the running state of the preceding vehicle may be recognized by a combination of an image captured by the front camera 40 and information detected by an object sensor such as a radar. The storage battery state recognition section 22 recognizes the remaining charge amount of the storage battery 50, etc. based on a detection signal from the storage battery sensor 51.

The idling stop control section 23 stops the engine 60 when the vehicle 100 stops due to waiting for a signal or the like, and controls an idling stop function to operate the starter motor 61 to start the engine 60 when the vehicle 100 re-starts running. The lower limit power supply information acquisition section 24 recognizes the lower limit voltage, which is the lower limit in the voltage range in which the connected device (the communication terminal 80 in FIG. 1) connected to the power supply unit 71 is guaranteed to perform a predetermined operation (here, charging operation).

The lower limit power supply information acquisition section 24 communicates with the communication terminal 80 via a connection cable 81 and the power supply unit 71, or wirelessly communicates with the communication terminal 80 via the communication unit 43, thereby acquiring model information of the communication terminal 80. Then, the lower limit power supply information acquisition section 24 reads the lower limit voltage information according to the model of the communication terminal 80 recorded in the lower limit voltage data 32, thereby acquiring the information of the lower limit voltage of the communication terminal 80. Note that the lower limit power supply information acquisition section 24 may access an external server through the communication unit 43, to acquire the lower limit voltage information (corresponding to lower limit power supply information of the present disclosure) indicating the lower limit voltage depending on the model of the communication terminal 80. Alternatively, the lower limit power supply information acquisition section 24 may communicate with the communication unit 43 to acquire the lower limit voltage information of the communication terminal 80. Alternatively, the lower limit power supply information acquisition section 24 may acquire lower limit power information (corresponds to the lower limit power supply information of the present disclosure) indicating the lower limit power that is the lower limit in the power range in which the charging operation of the communication terminal 80 is guaranteed.

The predetermined current setting section 25 sets a predetermined current so that the voltage of the power, which is to be supplied from the power supply unit 71 to the communication terminal 80, does not fall below the lower limit voltage based on the lower limit voltage information of the communication terminal 80 acquired by the lower limit power supply information acquisition section 24. The predetermined current setting section 25 further sets a predetermined current so that the power to be supplied from the power supply unit 71 to the communication terminal 80 does not become smaller than the lower limit power indicated by the lower limit power information when the lower limit power information of the communication terminal 80 is acquired by the lower limit power supply information acquisition section 24.

The current supply control section 26 causes the current supply switching section 70 to set up a current restricting state in which the current to be supplied from the storage battery 50 to the power supply unit 71 is restricted to a predetermined current or less from when the engine 60 is stopped by the idling stop function to when the engine 60 is started by operation of the starter motor 61 for re-starting running of the vehicle 100.

Thus, the current restricting state can prevent the voltage of the power to be supplied from the storage battery 50 to the communication terminal 80 via the power supply unit 71 from being lower than the lower limit voltage of the communication terminal 80 to interrupt the charging operation of the communication terminal 80. This makes it possible to avoid annoyance to the passengers of the vehicle 100 caused by the output of the notification sound from the communication terminal 80 when the charging operation is interrupted and when the charging operation is re-started by return of the voltage of the power, which is to be supplied from the power supply unit 71 to the communication terminal 80, to the lower limit voltage or higher due to operation stop of the starter motor 61 after start of the engine 60.

2. Actions by Current Supply Switching Section

Figure 2:
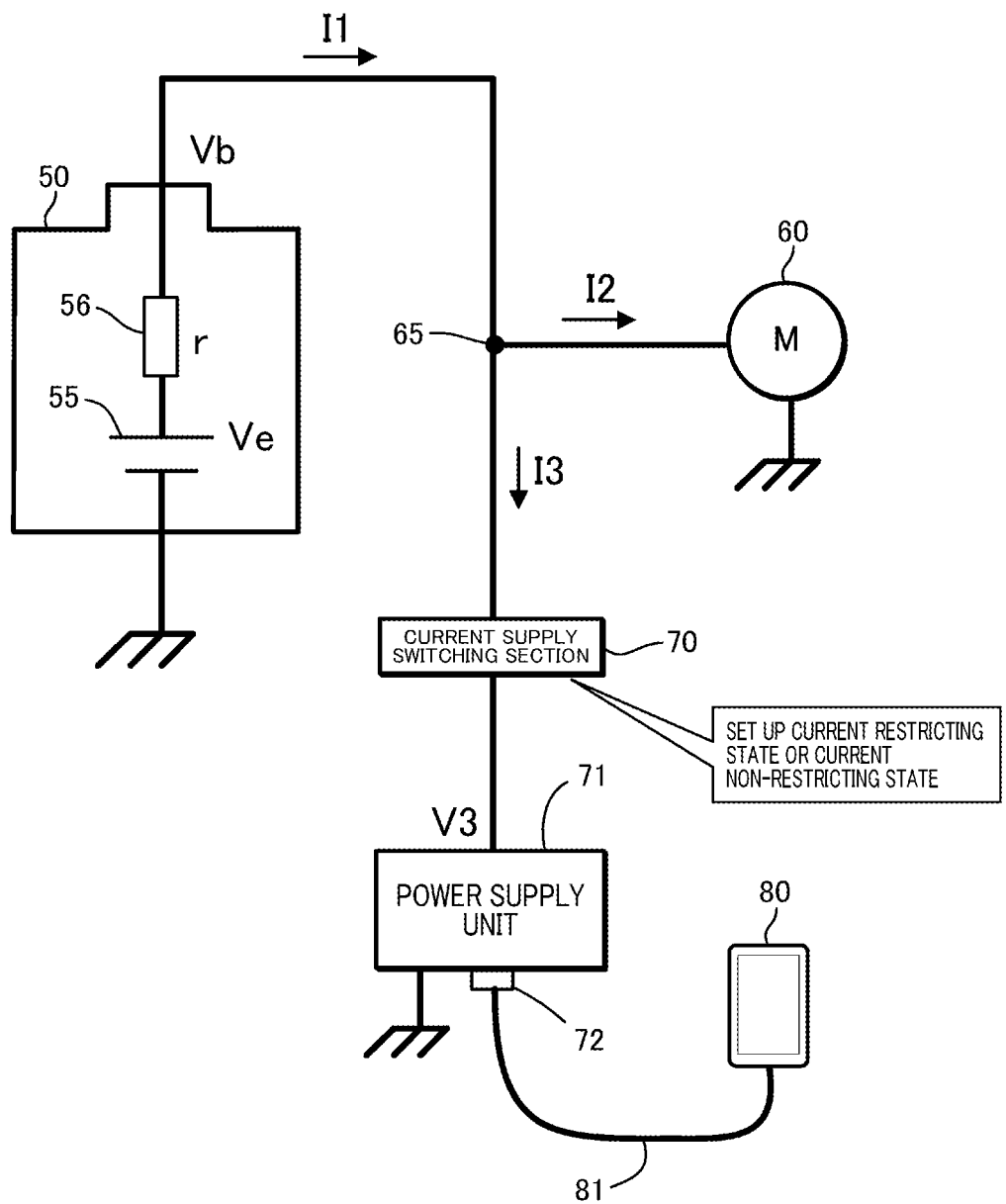
FIG. 2 is an explanatory diagram of actions of preventing drop of output voltage of a storage battery by current restriction processing.

The following describes actions caused by the current supply switching section 70 setting up the current restricting state with reference to FIG. 2. FIG. 2 shows a state in which the starter motor 61 and the power supply unit 71 are operated by electric power supplied from the storage battery 50 and the communication terminal 80 is connected to the connection terminal 72 of the power supply unit 71 by the connection cable 81. The communication terminal 80 is charged with power supplied from the power supply unit 71.

In FIG. 2, the storage battery 50 is schematically shown by an ideal power source 55 with an internal resistance of 0 and an internal resistance 56. In this case, the output voltage Vb of the storage battery 50 is represented by the following Expression (1). Here, it is assumed that the resistance of the conduction path between the storage battery 50, the starter motor 61, and the power supply unit 71 is so small as to be negligible with respect to the internal resistance 56.

$$Vb=Ve-I1\times r=Ve-(I2+I3)\times r \tag{1}$$

where Vb is an output voltage of the storage battery 50, Ve is an output voltage of the ideal power source 55, I1 is an output current of the storage battery 50, r is an internal resistance of the storage battery 50, I2 is a current to be supplied to the starter motor 61, and I3 is a current supplied to the power supply unit 71.

According to the above Expression (1), the current supply switching section 70 sets up a current restricting state in which the current I3 to be supplied to the power supply unit 71 is restricted to a predetermined current or less, enabling prevention of drop of the voltage V3 of the power to be supplied to the power supply unit 71 in operation of the starter motor 61. This can avoid interruption of charging of the communication terminal 80 caused by: the voltage V3 of the power, to be supplied to the power supply unit 71, lower than the lower limit voltage required for the power supplying operation of the power supply unit 71; or the voltage of the power, to be supplied from the power supply unit 71 to the communication terminal 80, lower than the lower limit voltage required for the charging operation of the communication terminal 80.

Contrarily, when the starter motor 61 does not operate, the current supply switching section 70 does not restrict current supply to the power supply unit 71, and can set up a current non-restricting state that allows current supply of a predetermined current or more to the power supply unit 71. This can increase the power to be supplied from the power supply unit 71 to the communication terminal 80, and can shorten the time required for charging the communication terminal 80.

3. Current Restriction Processing

A series of processing relating to current restriction processing executed by the power supply control apparatus 1 will be described according to flowcharts shown in FIGS. 3 and 4. After the vehicle 100 is powered on and the engine 60 is started, the power supply control apparatus 1 repeatedly executes the processing according to the flowcharts shown in FIGS. 3 and 4.

Figure 3:
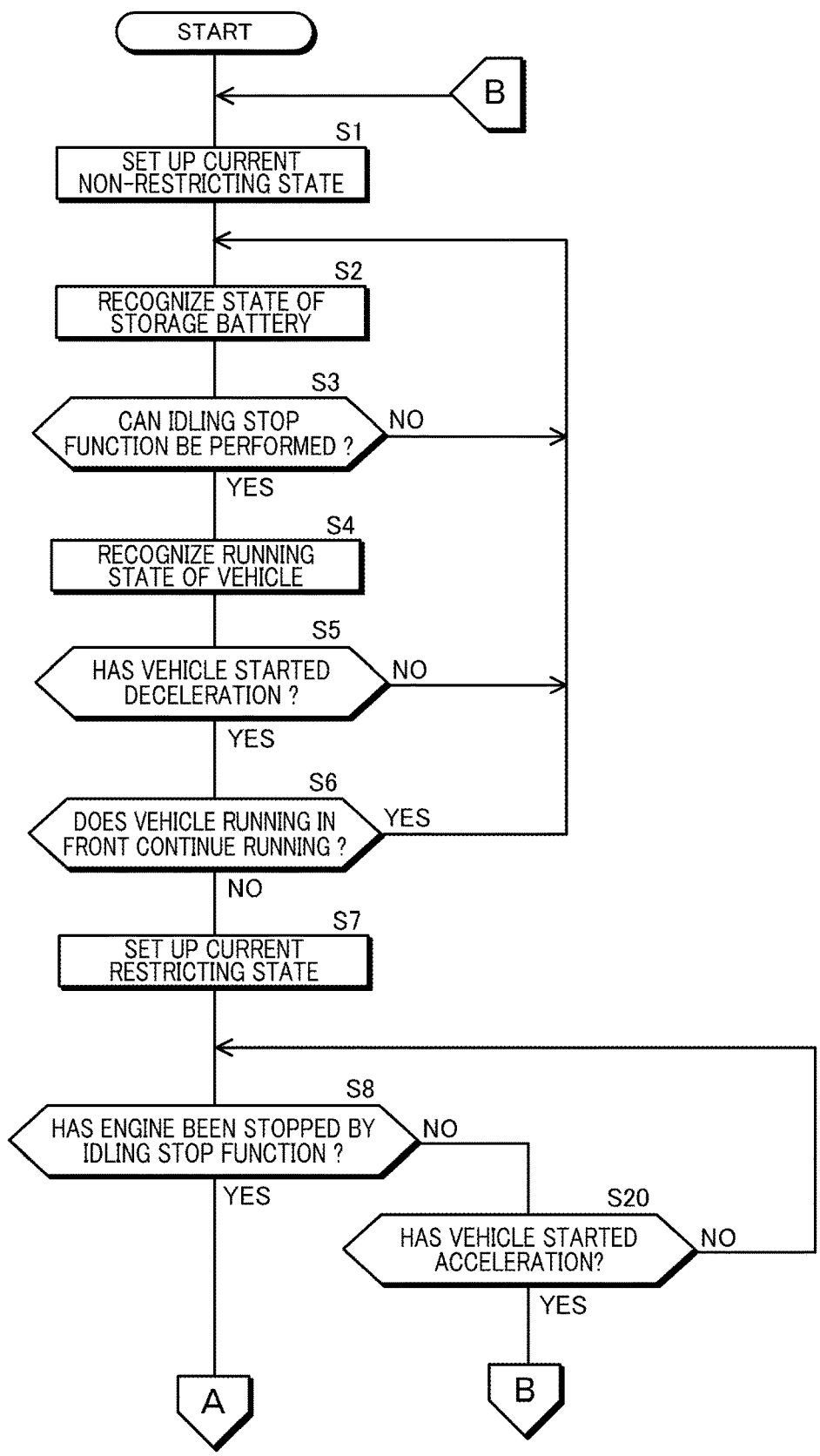
FIG. 3 is a first flow chart of processing relating to the current restriction processing.

At step S1 in FIG. 3, the current supply control section 26 causes the current supply switching section 70 to set up the current non-restricting state as an initial setting. In the subsequent step S2, the storage battery state recognition section 22 recognizes the state of the storage battery 50 based on the detection signal of the storage battery sensor 51. In the next step S3, the current supply control section 26 determines whether the power storage amount of the storage battery 50 is equal to or higher than a predetermined level to allow the idling stop control section 23 to perform the idling stop function. Then, the current supply control section 26 advances the processing to step S4 if the idling stop function can be performed, and advances the processing to step S2 if the idling stop function cannot be performed.

In step S4, the running state recognition section 21 recognizes the running state of the vehicle 100 based on the image captured by the front camera 40 and the detection signal of the speed sensor 41. In the subsequent step S5, the current supply control section 26 advances the processing to step S6 if the running state recognition section 21 recognizes that the vehicle 100 has started deceleration, and advances the processing to step S2 if the running state recognition section 21 does not recognize that the vehicle 100 has started deceleration.

In step S6, the current supply control section 26 determines whether the running state recognition section 21 recognizes that the vehicle running in front of the vehicle 100 continues running. Then, the current supply control section 26 advances the processing to step S2 if estimating that the vehicle running in front continues running and the vehicle 100 is unlikely to stop, and advances the processing to step S7 if the vehicle in front has stopped or there is no vehicle in front.

At step S7, the current supply control section 26 causes the current supply switching section 70 to set up the current restricting state. This restricts the current I3 (see FIG. 2) to be supplied from the storage battery 50 to the power supply unit 71 to a predetermined current or less. In this way, the current restricting state is set up in advance at a timing before the vehicle 100 stops, so that a state is set that prevents the voltage drop of the power to be supplied to the power supply unit 71 by the time when the starter motor 61 is operated by the idling stop function.

Here, the current restricting state may be set up immediately after it is recognized that the vehicle 100 starts deceleration, or the current restricting state may be set up when a predetermined time elapses, which time is set based on the estimated time until the vehicle 100 stops from the running speed and deceleration state of the vehicle 100.

Through the loop processing of subsequent steps S8 and S20, the current supply control section 26 determines in step S8 whether the engine 60 has been stopped by the idling stop control section 23 performing the idling stop function. In step S20, the current supply control section 26 then determines whether the running state recognition section 21 recognizes that the vehicle 100 has started acceleration.

Figure 4:
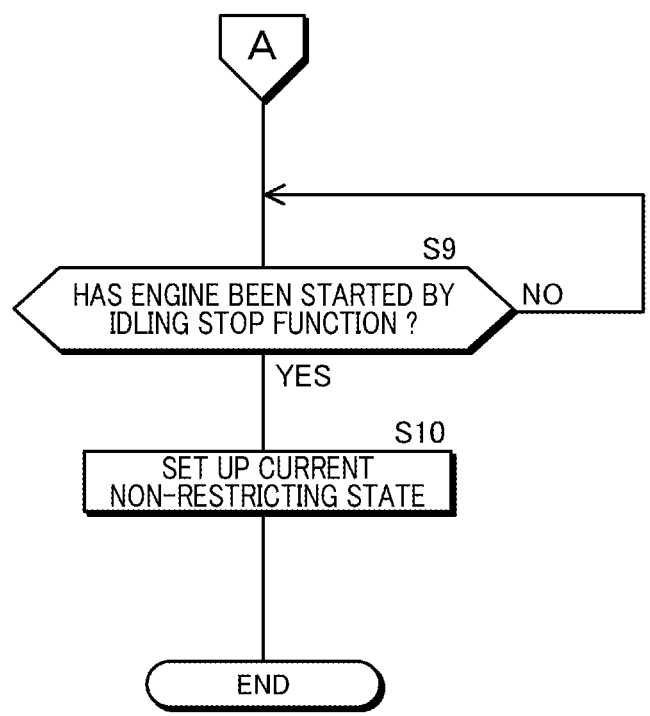
FIG. 4 is a second flow chart of processing relating to the current restriction processing.

Then, if it is recognized in step S8 that the engine 60 has stopped by the idling stop function, the current supply control section 26 advances the processing to step S9 in FIG. 4. In step S9, if the engine 60 is started by the operation of the starter motor 61 through the idling stop function performed by the idling stop control section 23, the processing proceeds to step S10.

At step S10, the current supply control section 26 causes the current supply switching section 70 to set up the current non-restricting state. This lifts the restriction on the current to be supplied from the storage battery 50 to the power supply unit 71, increases the power to be supplied from the power supply unit 71 to the communication terminal 80, and shortens the charging time of the communication terminal 80.

If it is recognized in step S20 in FIG. 3 that the vehicle 100 has started acceleration and it is estimated that the vehicle 100 continue running without stopping, the current supply control section 26 advances the processing to step S1. In this case, the engine 60 is not started by the starter motor 61, so in step S1, the current supply control section 26 causes the current supply switching section 70 to switch to the current non-restricting state.

4. Other Embodiments

In the above embodiment, the current supply control section 26 causes the current supply switching section 70 to switch to the current restricting state at the timing when running state recognition section 21 recognizes that the vehicle 100 has started deceleration in step S5 of FIG. 3. Another embodiment may be such that the current supply switching section 70 switches to the current restricting state at the timing immediately before the engine 60 is stopped by the idling stop function.

In the above embodiment, a storage battery state recognition section 22 is provided so that, if it is recognized at steps S2 and S3 in FIG. 3 that the idling stop function can be performed from the state of the storage battery 50, the current supply control section 26 sets up the current restricting state in step S7. Another embodiment may be such that the determination, in steps S2 and S3, of whether the idling stop function can be performed is omitted.

In the above embodiment, even if the vehicle 100 starts deceleration, the processing of step S6 in FIG. 3 does not set up the current restricting state in step S7 if the vehicle running in front continues running. Another embodiment may be such that the processing of determining whether the vehicle running in front continues running, in step S6, is omitted.

In the above embodiment, there are provided a lower limit power supply information acquisition section 24 and a predetermined current setting section 25, so that a predetermined current is set based on the lower limit voltage in the guaranteed operation voltage range of the communication terminal 80. However, the lower limit power supply information acquisition section 24 and the predetermined current setting section 25 may be omitted so as to set the predetermined current to a fixed value. Alternatively, the predetermined current may be set based on the lower limit voltage in the operation guarantee voltage of the electrical equipment that operates with the power to be supplied from the storage battery 50 such as the power supply unit 71. In this case, it is possible to avoid restricting the operation of the electrical equipment when the starter motor 61 is in operation.

In the above embodiment, as shown in FIGS. 1 and 2, a current supply switching section 70 is provided between the storage battery 50 and the power supply unit 71 to restrict the current I3 to be supplied to the power supply unit 71, thereby preventing a voltage drop of the power to be supplied to the power supply unit 71. Another configuration may be such that the current supply switching section 70 is provided between the storage battery 50 and the branch point 65 of the starter motor 61 and the power supply unit 71 to restrict the total current I1 to be supplied from the storage battery 50 to the starter motor 61 and the power supply unit 71, thereby preventing a voltage drop of the power to be supplied to the power supply unit 71.

Note that FIG. 1 is a schematic diagram showing the configuration of the power supply control apparatus 1 divided according to the main things to be processed, in order to facilitate understanding of the invention of the present application, but the power supply control apparatus 1 may be configured with another division. Further, the processing of each component may be executed by one hardware unit, or may be executed by a plurality of hardware units. In addition, the processing of each component shown in FIGS. 3 and 4 may be executed by one program, or may be executed by a plurality of programs.

4. Configuration Supported by Above Embodiments

The above embodiments are specific examples of the following configurations.

(Configuration 1) A power supply control apparatus that is mounted in a vehicle having an idling stop function for stopping an engine and starting the engine, and controls power supply to electrical equipment operated by power to be supplied from a storage battery provided in the vehicle, the power supply control apparatus including: a current supply switching section that switches between: a current restricting state in which a current to be supplied from the storage battery to the electrical equipment is restricted to a predetermined current or less; and a current non-restricting state in which a current exceeding the predetermined current is allowed to be supplied from the storage battery to the electrical equipment; and a current supply control section that executes current restriction processing to cause the current supply switching section to set up the current restricting state before the engine is started, the engine having been stopped by the idling stop function.

According to the power supply control apparatus of configuration 1, the current supply switching section executes current restriction processing to set up the current restricting state before the current supply control section starts consuming electric power for starting the engine stopped by the idling stop function. This makes it possible to prevent a voltage drop of power to be supplied to the electrical equipment in returning from the idling stop, with a simple and cost-saving configuration.

(Configuration 2) The power supply control apparatus according to configuration 1, further including: a lower limit power supply information acquisition section that acquires lower limit power supply information indicating a lower limit of a power-supply voltage or a power-supply power that enables the electrical equipment or a connected device to perform a predetermined operation, the connected device being connected to the electrical equipment, the connected device being supplied with power from the storage battery via the electrical equipment; and a predetermined current setting section that sets the predetermined current based on the lower limit power supply information.

According to the power supply control apparatus of configuration 2, a predetermined current is set based on the lower limit power supply information of the electrical equipment or the connected device connected to the electrical equipment. This makes it possible to reduce the influence of restricting the current supply to the electrical equipment or connected device.

(Configuration 3) The power supply control apparatus according to configuration 2, wherein the predetermined current setting section sets the predetermined current: so that an output voltage of the storage battery is higher than the lower limit of the power-supply voltage indicated by the lower limit power supply information; or so that power to be supplied from the storage battery to the electrical equipment is greater than the lower limit of the power-supply power indicated by the lower limit power supply information.

According to the power supply control apparatus of configuration 3, it is possible to set a predetermined current so as to ensure the predetermined operation of the electrical equipment or the connected device connected to the electrical equipment.

(Configuration 4) The power supply control apparatus according to any one configuration of configurations 1 to 3, further including a storage battery state recognition section that recognizes a state of the storage battery, wherein the current supply control section does not execute the current restriction processing if it is determined, from a state of the storage battery, that the idling stop function cannot be performed, the state being recognized by the storage battery state recognition section.

According to the power supply control apparatus of configuration 4, it is possible to avoid restriction of the operation of the electrical equipment and the connected device due to the execution of the current restriction processing when the engine stopped by the idling function is not started due to a decrease in the power storage amount in the storage battery, etc.

(Configuration 5) The power supply control apparatus according to any one configuration of configurations 1 to 4, wherein the current supply control section starts the current restriction processing within a predetermined time after the engine is stopped by the idling stop function.

According to the power supply control apparatus of configuration 5, the current restriction processing is started immediately after the engine is stopped by the idling stop function. This makes it possible to more reliably prevent a voltage drop of the power supplied to the electrical equipment or the connected device when the engine is started by the starter motor.

(Configuration 6) The power supply control apparatus according to any one configuration of configurations 1 to 5, further including a running state recognition section that recognizes a running state of the vehicle, wherein the current supply control section determines a timing to start the current restriction processing based on the running state of the vehicle recognized by the running state recognition section.

According to the power supply control apparatus of configuration 6, the timing to start the current restriction processing is determined based on the running state of the vehicle. This makes it possible to prevent the current restricting state from being set up in an unnecessary situation.

(Configuration 7) The power supply control apparatus according to configuration 5, wherein the current supply control section starts the current restriction processing when the running state recognition section recognizes that the vehicle has started deceleration.

According to the power supply control apparatus of configuration 7, start of the vehicle deceleration can cause the current restriction processing to start at an estimated timing when it is highly likely that the vehicle stops and the engine stops due to the idling stop function.

(Configuration 8) The power supply control apparatus according to configuration 6, wherein the current supply control section does not start the current restriction processing when the running state recognition section recognizes that the vehicle has started deceleration while a preceding vehicle of the vehicle is moving forward.

According to the power supply control apparatus of configuration 7, it is estimated that the preceding vehicle is highly likely to continue running without stopping when the preceding vehicle is moving forward even if the vehicle starts deceleration. Therefore, in this case, the current restriction processing is not started, so that it is possible to avoid restricting the current supply to the electrical equipment or the connected device.

(Configuration 9) A power supply control method causing a computer to control power supply to electrical equipment in a vehicle having an idling stop function for stopping an engine and starting the engine, the electrical equipment being operated by power to be supplied from a storage battery provided in the vehicle, the power supply control method including: a current supply switching step that switches between: a current restricting state in which a current to be supplied from the storage battery to the electrical equipment is restricted to a predetermined current or less; and a current non-restricting state in which a current exceeding the predetermined current is allowed to be supplied from the storage battery to the electrical equipment; and a current supply control step that executes current restriction processing to cause the current supply switching step to set up the current restricting state before the engine is started, the engine having been stopped by the idling stop function.

The computer-executed power supply control method of configuration 9 can provide the same actions and effects as those of the power supply control apparatus of configuration 1.

REFERENCE SIGNS LIST

1 . . . power supply control apparatus, 10 . . . vehicle control apparatus, 20 . . . processor, 21 . . . running state recognition section, 22 . . . storage battery state recognition section, 23 . . . idling stop control section, 24 . . . lower limit power supply information acquisition section, 25 . . . predetermined current setting section, 26 . . . current supply control section, 30 . . . memory, 31 . . . program, 32 . . . lower limit voltage data, 40 . . . front camera, 41 . . . speed sensor, 42 . . . communication unit, 50 . . . storage battery, 51 . . . storage battery sensor, 60 . . . engine, 61 . . . starter motor, 62 . . . generator, 63 . . . charging circuit, 70 . . . current supply switching section, 71 . . . power supply unit (electrical equipment), 72 . . . connection terminal, 80 . . . communication terminal (connected device), 81 . . . connection cable.

What is claimed is:

1. A power supply control apparatus that is mounted in a vehicle having an idling stop function for stopping an engine and starting the engine, and controls power supply to electrical equipment operated by power to be supplied from a storage battery provided in the vehicle, the power supply control apparatus comprising:

a current supply switching section that switches between:
a current restricting state in which a current to be supplied from the storage battery to the electrical equipment is restricted to a predetermined current or less; and a current non-restricting state in which a current exceeding the predetermined current is allowed to be supplied from the storage battery to the electrical equipment;

a current supply control section that executes current restriction processing to cause the current supply switching section to set up the current restricting state before the engine is started, the engine having been stopped by the idling stop function; and a running state recognition section that recognizes a running state of the vehicle, wherein the current supply control section:
starts the current restriction processing when the running state recognition section recognizes that the vehicle has started deceleration, and
starts the current restricting state when a predetermined time elapses, the predetermined time being based on a time until the vehicle stops.

2. The power supply control apparatus according to claim 1, further comprising:

a lower limit power supply information acquisition section that acquires lower limit power supply information indicating a lower limit of a power-supply voltage or a power-supply power that enables the electrical equipment or a connected device to perform a predetermined operation, the connected device being connected to the electrical equipment, the connected device being supplied with power from the storage battery via the electrical equipment; and a predetermined current setting section that sets the predetermined current based on the lower limit power supply information.

3. The power supply control apparatus according to claim 2, wherein the predetermined current setting section sets the predetermined current: so that an output voltage of the storage battery is higher than the lower limit of the power-supply voltage indicated by the lower limit power supply information; or so that power to be supplied from the storage battery to the electrical equipment is greater than the lower limit of the power-supply power indicated by the lower limit power supply information.

4. The power supply control apparatus according to claim 1, further comprising a storage battery state recognition section that recognizes a state of the storage battery, wherein the current supply control section does not execute the current restriction processing if it is determined, from a state of the storage battery, that the idling stop function cannot be performed, the state being recognized by the storage battery state recognition section.

5. The power supply control apparatus according to claim 1, wherein the current supply control section starts the current restriction processing within a predetermined time after the engine is stopped by the idling stop function.

6. A power supply control apparatus that is mounted in a vehicle having an idling stop function for stopping an engine and starting the engine, and controls power supply to electrical equipment operated by power to be supplied from a storage battery provided in the vehicle, the power supply control apparatus comprising:

a current supply switching section that switches between:
a current restricting state in which a current to be supplied from the storage battery to the electrical equipment is restricted to a predetermined current or less; and a current non-restricting state in which a current exceeding the predetermined current is allowed to be supplied from the storage battery to the electrical equipment;
a current supply control section that executes current restriction processing to cause the current supply switching section to set up the current restricting state before the engine is started, the engine having been stopped by the idling stop function; and
a running state recognition section that recognizes a running state of the vehicle,
wherein the current supply control section starts the current restriction processing when the running state recognition section recognizes that the vehicle has started deceleration.

7. A power supply control apparatus that is mounted in a vehicle having an idling stop function for stopping an engine and starting the engine, and controls power supply to electrical equipment operated by power to be supplied from a storage battery provided in the vehicle, the power supply control apparatus comprising:
a current supply switching section that switches between: a current restricting state in which a current to be supplied from the storage battery to the electrical equipment is restricted to a predetermined current or less; and a current non-restricting state in which a current exceeding the predetermined current is allowed to be supplied from the storage battery to the electrical equipment;
a current supply control section that executes current restriction processing to cause the current supply switching section to set up the current restricting state before the engine is started, the engine having been stopped by the idling stop function; and
a running state recognition section that recognizes a running state of the vehicle,
wherein the current supply control section:
starts the current restriction processing when the running state recognition section recognizes that the vehicle has started deceleration, and
does not start the current restriction processing when the running state recognition section recognizes that the vehicle has started deceleration while a preceding vehicle of the vehicle is moving forward.

8. A power supply control method causing a computer to control power supply to electrical equipment in a vehicle having an idling stop function for stopping an engine and starting the engine, the electrical equipment being operated by power to be supplied from a storage battery provided in the vehicle, the power supply control method comprising:
a current supply switching step that switches between: a current restricting state in which a current to be supplied from the storage battery to the electrical equipment is restricted to a predetermined current or less; and a current non-restricting state in which a current exceeding the predetermined current is allowed to be supplied from the storage battery to the electrical equipment;
a running state recognition step that recognizes a running state of the vehicle; and
a current supply control step that executes current restriction processing to cause the current supply switching step to set up the current restricting state before the engine is started, the engine having been stopped by the idling stop function, and starts the current restriction processing when the running state recognition step recognizes that the vehicle has started deceleration, and starts the current restricting state when a predetermined time elapses, the predetermined time being based on a time until the vehicle stops.

9. A power supply control method causing a computer to control power supply to electrical equipment in a vehicle having an idling stop function for stopping an engine and starting the engine, the electrical equipment being operated by power to be supplied from a storage battery provided in the vehicle, the power supply control method comprising:
a current supply switching step that switches between: a current restricting state in which a current to be supplied from the storage battery to the electrical equipment is restricted to a predetermined current or less; and a current non-restricting state in which a current exceeding the predetermined current is allowed to be supplied from the storage battery to the electrical equipment;
a running state recognition step that recognizes a running state of the vehicle; and
a current supply control step that executes current restriction processing to cause the current supply switching step to set up the current restricting state before the engine is started, the engine having been stopped by the idling stop function, and starts the current restriction processing when the running state recognition step recognizes that the vehicle has started deceleration.

10. A power supply control method causing a computer to control power supply to electrical equipment in a vehicle having an idling stop function for stopping an engine and starting the engine, the electrical equipment being operated by power to be supplied from a storage battery provided in the vehicle, the power supply control method comprising:
a current supply switching step that switches between: a current restricting state in which a current to be supplied from the storage battery to the electrical equipment is restricted to a predetermined current or less; and a current non-restricting state in which a current exceeding the predetermined current is allowed to be supplied from the storage battery to the electrical equipment;
a running state recognition step that recognizes a running state of the vehicle; and
a current supply control step that executes current restriction processing to cause the current supply switching step to set up the current restricting state before the engine is started, the engine having been stopped by the idling stop function, and starts the current restriction processing when the running state recognition step recognizes that the vehicle has started deceleration, and does not start the current restriction processing when the running state recognition step recognizes that the vehicle has started deceleration while a preceding vehicle of the vehicle is moving forward.

* * * * *